US010306970B2

(12) United States Patent
Calabrese

(10) Patent No.: US 10,306,970 B2
(45) Date of Patent: Jun. 4, 2019

(54) HAIR EXTENSION STORAGE ORGANIZER

(71) Applicant: June N Calabrese, Oak Harbor, WA (US)

(72) Inventor: June N Calabrese, Oak Harbor, WA (US)

( * ) Notice: Subject to any disclaimer, the term of this patent is extended or adjusted under 35 U.S.C. 154(b) by 0 days.

(21) Appl. No.: 15/909,050

(22) Filed: Mar. 1, 2018

(65) Prior Publication Data
US 2018/0242716 A1 Aug. 30, 2018

Related U.S. Application Data

(60) Provisional application No. 62/446,318, filed on Jan. 13, 2017.

(51) Int. Cl.
A45D 40/00 (2006.01)
A45D 44/04 (2006.01)
A47F 7/06 (2006.01)
A45C 11/00 (2006.01)
A45D 44/02 (2006.01)
A41G 5/00 (2006.01)
A47G 25/40 (2006.01)
F16M 13/02 (2006.01)

(52) U.S. Cl.
CPC ........... *A45D 44/04* (2013.01); *A41G 5/0073* (2013.01); *A41G 5/0086* (2013.01); *A45C 11/00* (2013.01); *A45D 44/02* (2013.01); *A47F 7/06* (2013.01); *A47G 25/40* (2013.01); *F16M 13/022* (2013.01); *A47F 7/065* (2013.01)

(58) Field of Classification Search
CPC ........ A45D 44/04; A45D 11/24; A45D 11/26; A41G 5/0073; A41G 5/0086; A41G 5/00; A41G 5/004; A47F 7/065; A47G 25/40; F16M 13/022; B65D 85/70; B65D 73/0014; B65D 77/26
USPC .......................................................... 224/581
See application file for complete search history.

(56) References Cited

U.S. PATENT DOCUMENTS

| | | | |
|---|---|---|---|
| 3,029,852 A * | 4/1962 | Taylor | A45C 3/00 383/16 |
| D644,426 S | 9/2011 | Skaggs | |
| D723,741 S | 3/2015 | Caplan | |
| 8,998,002 B1 | 4/2015 | Milner | |
| 9,185,956 B2 * | 11/2015 | Batres | A45C 11/24 |
| 9,332,820 B2 | 5/2016 | Bernard | |
| 9,339,138 B2 | 5/2016 | Eslami | |
| D768,337 S | 10/2016 | Treb | |
| 9,492,021 B2 | 11/2016 | Kebreau | |
| 2005/0194015 A1 * | 9/2005 | Watts | A41G 5/0073 132/53 |
| 2013/0104922 A1 | 5/2013 | Hall | |
| 2013/0206628 A1 * | 8/2013 | Batres | A45C 11/26 206/457 |
| 2015/0196143 A1 | 7/2015 | Sterling | |

(Continued)

*Primary Examiner* — Rachel R Steitz

(57) ABSTRACT

Disclosed is a portable hair extension holder comprising a foldable main body with an attached clip-engaging system and retaining members for keeping hair extensions protected and organized between uses. The clip-engaging system includes non-rigid elements, preferably assembled in a grid, which provide a surface for attaching hair extensions in an organized arrangement. A process for attaching hair extensions to the clip-engaging system is also disclosed.

3 Claims, 7 Drawing Sheets

(56) References Cited

U.S. PATENT DOCUMENTS

2015/0223537 A1\* 8/2015 Kim ..................... A41G 5/004
206/581

\* cited by examiner

HAIR EXTENSION STORAGE ORGANIZER

CROSS-REFERENCES TO RELATED APPLICATIONS

This application claims the benefit of U.S. Provisional Application No. 62/446,318 filed Jan. 13, 2017. The complete contents of this earlier application are hereby incorporated by reference.

TECHNICAL FIELD OF THE INVENTION

The present invention relates to portable devices for storing hair extensions.

DESCRIPTION OF THE RELATED ART

Hair extensions are portions of human or synthetic hair designed to be integrated into one's natural hair for the purpose of enhancing its existing appearance. Unlike a wig or other single-piece hair enhancement, hair extensions are typically worn as a set of several gathered hair portions, each known as a "weft" attached at different areas around the head.

In recent years, hair extensions designed for temporary and semi-permanent use have become especially popular. These include "clip-in" extensions, which are attached to an individual's hair by small snap clips sewn into them, and "tape-in" extensions, which use specialized tape for bonding the natural and superficial hair together near the roots.

These types of hair extensions can be applied and removed relatively easily, and are intended for reuse if properly maintained. However, few products are available to help maintain their quality or address the specific needs pertaining to hair extensions that are designed for reuse.

For example, in order to preserve their quality and integrity for future use, reusable hair extensions should be carefully stored after removal. Unfortunately, hair extensions are not typically provided with any means of keeping them sufficiently protected. Without a proper storage device, hair extensions are often kept in flimsy cardboard packaging, plastic bags, drawers, or other makeshift means of storage which fail to protect them from a number of problems, some of which are briefly explained below:

1. Tangling. When hair extensions shift against each other, particularly at their ends, tangling may occur and lead to knotting. The process of brushing the knots out and separating them is time-consuming and often results in some breakage.
2. Dryness. If hair extensions are stored in cloth (wrapped up in a towel or pillowcase, for example), certain fabrics (such as cotton) can absorb the hair's moisture, leaving it dry and dull-looking. Also, the friction between certain fabrics and the surface of the hair can cause breakage and frizz.
3. Environmental Damage. Exposure to everyday elements that negatively impact the quality or appearance of hair extensions may occur simply as a result of not being covered.
4. Creasing: When weight is applied (for example, when being packed in a suitcase under other items), the structure of hair extensions can take on the appearance of a "dent" or "crease." This also occurs when hair extensions are folded over for storage.
5. Snagging/Tearing: This is very common when hair extensions are stored near components or rough material that hair gets caught on, such as a zipper.

Not only are these problems inconvenient to the user, the resulting damage can substantially impact the longevity and quality of hair extensions. It would be in the best interest of the user's time and resources to keep hair extensions in a protective storage device in between uses.

Keeping hair extensions organized can also be challenging. Hair extensions are arranged in a particular manner on the individual's head in order to blend with the existing hair and other hair extensions. If hair extensions become disorganized after removal, it can be difficult and time-consuming for the user to correctly place them when reapplying. An organizing system which keeps hair extensions separated and arranged in a manner that helps identify their position for placement would be helpful. This would also be beneficial for styling, as it provides a better idea of how to style certain hair extensions according to their position during use and allows a user to style the hair extensions more efficiently.

Past attempts to provide such a device for hair extensions have not been optimal due to one or more of the following reasons: inclusion of potentially damaging components (such as zippers) that can snag or tear hair; a structural design that enables hair extensions to become tangled easily; a body constructed of material which does not provide sufficient protection from outside elements; and/or a structural design that causes hair to become creased. U.S. Pat. No. 9,185,956B2 to Batres et. al, for example, discloses a combination clutch bag/hair carrier in which hair extensions are folded into the main body of the apparatus as it collapses into a structure resembling a woman's handbag. While this may provide a suitable means for "disguising" a hair extension storage apparatus as a clutch bag, attached hair extensions can become creased as they roll with the main body into the closed configuration as it is described to do. Other products ubiquitously marketed as hair extension storage include a fabric bag with an opening at the top which allow the protrusion of a "clamp"-type hanger as a means for attaching hair extensions. Such hangers are problematic as the clamp releases the hair extension all at once, making it difficult to place and remove wefts individually. Furthermore, if the hanger breaks—as they are historically prone to do as the spring inside the clamp eventually wears out—the product is no longer functional for holding hair extensions. Other products may sufficiently perform a certain task relating to hair extensions; for example, the device which hangs hair extensions for styling and/or drying disclosed by U.S. Pat. No. 9,492,021B2 to Kebreau. However, adequate protection for storage is not included along with such functions.

It is also worth noting that the products described in the examples above do not provide storage capacity for multiple sets of hair extensions. As the variety of styles and the popularity of hair extensions have continued to increase, so has the number of hair extension users owning more than one set of hair extensions; accordingly, a storage apparatus having sufficient capacity to store multiple sets of hair extensions is desirable.

It is evident that in order to accommodate the various needs of hair extension storage, organization, and protection with one device, a new and multi-functional hair extension storage and organization apparatus is necessary.

BRIEF SUMMARY OF THE INVENTION

The present invention solves the above-mentioned challenges and limitations of the prior art by providing a portable hair extension storage organizer which keeps hair extensions protected and organized during storage, comprising a foldable, generally rectangular main body suitably dimensioned to accommodate hair extensions, with an attached clip-engaging system, retaining members and an attached flexible handle.

In preferred embodiments, the present invention is adapted for folding into a collapsible condition of a reduced overall dimension, making it convenient for a user to pack and transport hair extensions while also providing many advantages for storing, shipping, packaging, and display. In one such embodiment, side portions of the main body fold laterally inward to provide a cover for the clip-engaging system and hair extensions attached during use; thus, in these embodiments, an external cover panel is not necessary as the side portions provide a covering element sufficient for protecting the contents of the hair extension storage organizer.

One of the most useful aspects of the present invention is the means by which hair extensions are attached to the main body. Instead of a "clamp"-type component or other rigid hardware attached to the present invention, a "clip-engaging system" formed of flexible members is provided so that hair extensions can easily be attached using their own built-in clip-components or with a fastening component provided by the user, such as a sectioning clip or bobby pin. Not only does this allow a user to attach and remove hair extensions individually, but hair extensions can be placed in an arrangement advantageous for styling and reapplication. Furthermore, when the main body transitions into another position by folding laterally, attached hair extensions fold with the flexible clip-engaging system without bending or creasing. Flexible straps are attached to provide a retaining means for the ends of hair extensions, which often get tangled if hung loosely or unsecured. With the retaining means of the preferred embodiment, a user can choose to drape the ends of hair extensions underneath flexible retaining straps in order to prevent the shifting and movement that often leads to tangling.

A flexible handle member is also attached to the main body which can be utilized for conveniently hanging or carrying the hair extension storage organizer. Like the clip-engaging system, the flexible handle member is formed of non-rigid material to accommodate the overall foldable design and to provide a lightweight and convenient storage device.

The main body of the present invention is suitably dimensioned to accommodate the lengths of hair extensions; when attached to the clip-engaging system, hair extensions are substantially covered by the main body without their ends bending or creasing in effort to fit. While hair extensions exist in many different lengths, the lengths of hair extensions among sets most commonly purchased and available to consumers is no longer than 26," and thus a preferred dimension for the main body is 26" in length, with a substantially congruent width in certain embodiments. The main body may be sized in proportion to other lengths of hair extensions expected for use with the invention; summarily, it should be taken into consideration that hair extension lengths vary significantly, and the present invention aims to accommodate the lengths of hair extensions most commonly purchased by the average consumer (at the time of submitting this application). It is to be anticipated that this length could change in accordance with ever-changing trends as well as the development and availability of new hair extension products; however, the overall concept of the present invention of a foldable main body with a non-rigid clip-engaging system remains consistent even with such changes.

BRIEF SUMMARY OF THE DRAWINGS

It is to be understood that the present invention may be demonstrated in various configurations and are not limited to the details and arrangement of components of the embodiments provided in the following description or as illustrated in the drawings, which are provided for illustrative purposes and should not be regarded as limiting.

DESCRIPTION OF THE PREFERRED EMBODIMENT

Figure 1:
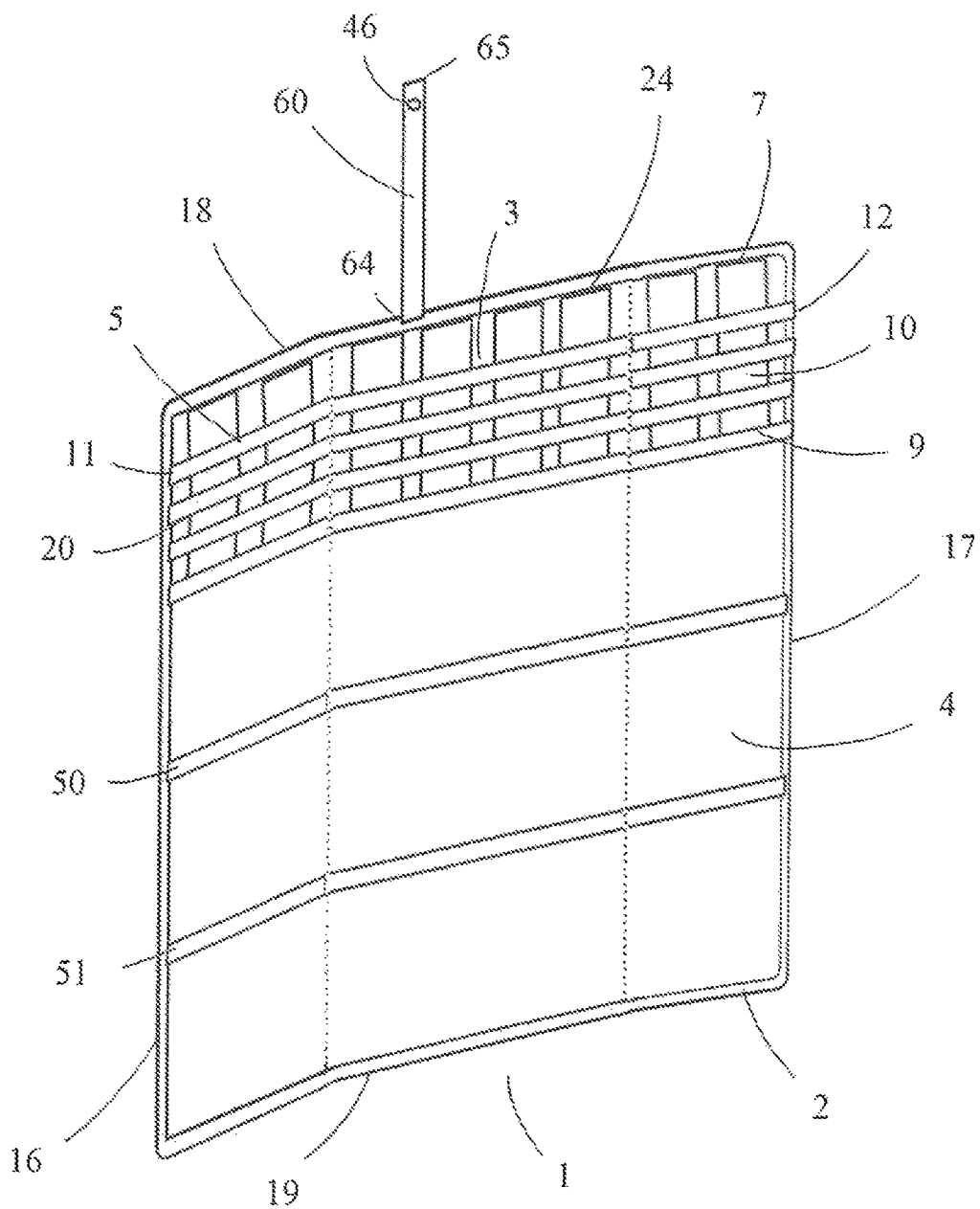
FIG. 1 is a front perspective view of the hair extension storage organizer in an open position.

As best seen in FIG. 1, the portable hair extension storage organizer of the present invention includes a foldable main body 1, formed of a substantially planar, generally rectangular panel 2, with an attached clip-engaging system 3. The rectangular panel 2, although formed mostly of flexible material, is of sufficient rigidity to maintain its shape while folding and may be constructed of separate, equally-dimensioned layers of flexible material fused together to provide a more substantial single rectangular panel 2 with a first surface 4 of smooth, minimally-absorbent material, preferably a woven fabric such as satin, and an opposing second surface 5 of a lightweight, preferably water-resistant material which can also be manufactured in a variety of colors and prints (preferably nylon or polyester).

Layers may be reinforced with a flexible interfacing to help provide adequate stiffness to the rectangular panel 2 for maintaining its shape and structure without impeding its foldability or, as an alternative, the second surface 5 may be coated with a fabric-stiffening agent such as polyvinyl chloride (PVC), which also adds favorable tear- and water-resistance to the material.

The specific materials described above are preferable in the construction of the main body 1 for the purpose of providing interior and exterior protection to the portable hair extension storage organizer and its contents. Satin, for example, has been purposefully implemented for having properties proven to create less friction and absorb less moisture from hair. However, other non-rigid, non-abrasive materials may be used in the construction of the main body 1 which provide the structure and protective qualities for the present invention to achieve its overall purpose.

Another useful aspect of the present invention is the clip-engaging system 3 providing the means for attaching hair extensions to the main body 1. In place of a "clamp"-type component or other rigid hardware, the clip-engaging system 3 is formed of a grid of flexible members to which hair extension wefts can be individually attached, removed, and stored in an arrangement preferable to the user. The clip-engaging system 3, having no plastic or metal parts, is also lighter, cheaper to manufacture, and less prone to breaking than rigid components. It is also worth noting the advantage of excluding small rigid parts from a safety perspective, as the present invention does not pose a choking hazard for children or pets.

Figure 3:
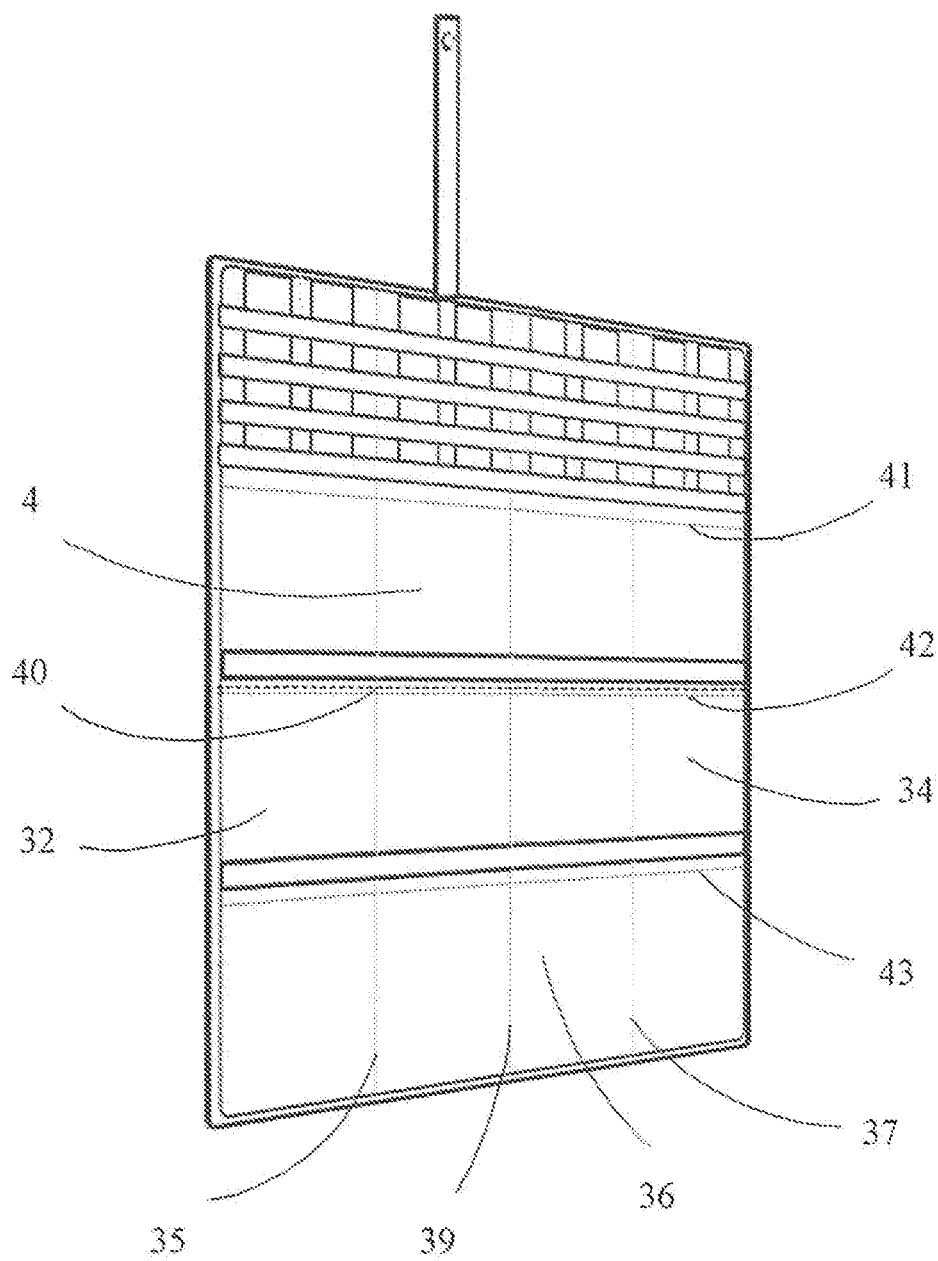
FIG. 3 is s side perspective view of the hair extension storage organizer in an open position.

As can be seen best in FIGS. 1 and 3, the clip-engaging system 3 of the preferred embodiment includes a plurality of clip-engaging elements 3 attached to the first surface 4 of the rectangular panel 2. Each clip-engaging element is formed of a flexible member 5, 10 extending between a first side portion 7, 11 and a second side portion 9, 12 attached to the main body 1, which facilitate a fastening component securing an article to the main body 1. Elements forming the clip-engaging system 3 are substantially planar so as not to impede with the foldability or storing of the present invention. In the context of the present invention, the clip-engaging elements 3 provide a surface (the flexible member 5, 10) to which hair extensions can be attached by their built-in clip components or with a fastening component provided by the user, such as a snap hair clip or bobby pin.

Figure 5:
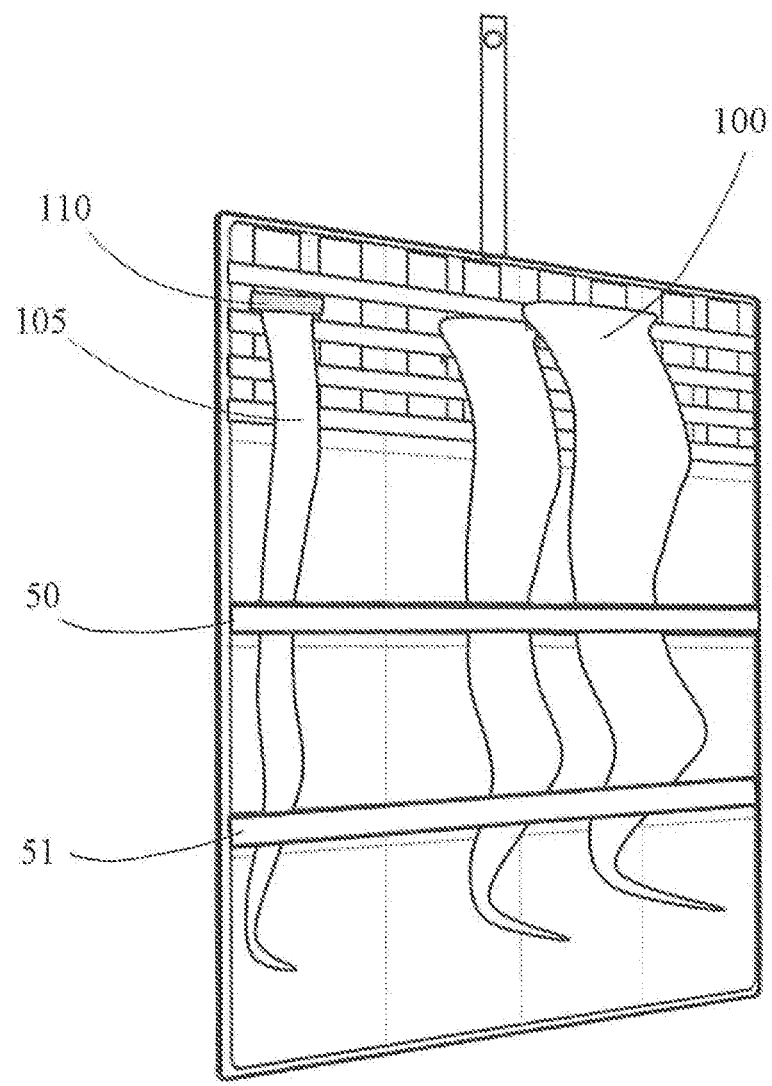
FIG. 5 is a side perspective view of the hair extension storage organizer of FIG. 3 in use.

One example of use of the present invention is demonstrated by a user unsnapping a clip component of a clip-in hair extension (a general clip-in hair extension weft is illustrated in 100 of FIG. 5), fastening the clip component to a flexible segment 5 along one of the rows of horizontally-extending clip-engaging elements 20, and snapping the clip component into a closed position. An example of another use of the present invention is demonstrated by a user placing a tape-in hair extension (a general tape-in hair extension weft is illustrated in 105 of FIG. 5) on top of one of the vertically-extending clip-engaging elements 24, providing a fastening component having a flat body with two prongs extending from a shared joint such as a snap hair clip, sectioning clip, or bobby pin (a general fastening component is illustrated in 110 of FIG. 5), creating space between the two extended prongs, sliding one prong of the opened fastening component 110 in the space behind the vertically-extending clip-engaging element 24, and closing the space between the two extended prongs so that pressure is applied to the tape-in hair extension 105 and vertically-extending clip-engaging element 24 sufficient to secure the tape-in hair extension 105 into place.

With hair extensions attached to the present invention in an arrangement satisfactory to the user, the main body 1 may be folded laterally into a "closed" position (illustrated in FIG. 6) and then stored for later use by hanging it with an attached flexible handle member 60 (which shall be introduced and described later).

The description above is just one of many examples of how the present invention may be used, and should not be regarded as limiting. This particular use and others will be better understood with the following continued explanation of the present invention and its features.

A preferred embodiment of the present invention is portrayed in FIG. 1, wherein the clip-engaging system 3 includes horizontally-extending clip-engaging elements 20, each attached to the main body 1 by a first side portion 6 and second side portion 8 in an arrangement parallel to the first side edge 16 and second side edge 17 of the rectangular panel, and vertically-extending clip-engaging elements 24, each attached to the main body 1 by a first side portion 7 and second side portion 9 in an arrangement parallel to the top edge 18 and bottom edge 19 of the rectangular panel 2. As illustrated in FIG. 1, the horizontally-extending clip-engaging elements 20 and vertically-extending clip-engaging elements 24 of the preferred embodiment are attached in a grid formation.

In various preferred embodiments, the horizontally-extending clip-engaging elements 20 are arranged in rows, preferably 4 or more, with a first row distanced approximately 1" (one inch) from the top edge 18 of the main body 1. In one such embodiment, the rows of horizontally-extending clip-engaging elements 20 comprise narrow straps having opposing ends 11, 12 connected to the main body which may be attached at or substantially near the first side edge 16 and second side edge 17 of the rectangular panel 2. Each strap may be further connected to the main body 1 at points in between its opposing ends 11, 12, providing tension so as the strap does not collapse or substantially sag under the weight of hair extensions attached thereto. In these embodiments and others, several horizontally-extending clip-engaging elements 20 may be arranged contiguously to form each row or to form additional rows.

The horizontally-extending clip-engaging elements 20 of the preferred embodiment are straps formed of ½" (half-inch) wide segments of pliable, non-abrasive material, preferably reinforced satin, but may be formed of other materials which provide a sufficient thickness, texture, and pliability to engage clip-in hair extensions without damaging them.

In alternative embodiments, the horizontally-extending clip-engaging elements 20 may include a flexible article having three attached side portions (such as structure resembling a pocket) with space provided between the flexible article and the first surface 4 sufficient for attaching a clip component to the flexible article.

Vertically-extending clip-engaging elements 24 of the clip-engaging system 3 of the preferred embodiment are connected by a first end portion 7 to the main body 1 at or substantially near the top edge 18 of the rectangular panel 2 and extend vertically along the space between the first surface 4 and the horizontally-extending clip-engaging members 20 to a point not exceeding further than the horizontal row furthest from the top edge 18 wherein a second end portion is connected 9 to the main body 1, and may be attached at points in between the first end portion 7 and second end portion 9 to the main body by connective means extending parallel to the top edge 18 of the rectangular panel 2.

The vertically-extending clip-engaging elements 24 of the clip-engaging system 3, in preferred embodiments, comprise segments of flexible material approximately 2" (two inches) wide to correspond with the widths common to most tape-in hair extension wefts, as well as the user-provided fastening components anticipated to be used in securing them. For example, a tape-in extension weft (a general tape-in hair extension weft is illustrated in 105 of FIG. 5) may be secured to the main body 1 by fastening it to a vertically-extending clip-engaging element 24 with a user-provided fastening component 110 such as a bobby pin, sectioning clip, or snap hair clip, which are ideal fastening components for the task and also likely to be readily available or easily accessible for a hair extension user. For example, a user may place a tape-in hair extension weft 105—or any hair extension weft having a width of approximately 2" (two inches)—lengthwise along a vertically-extending clip-engaging element 24 such that the edges of the vertically-extending clip-engaging element 24 and tape-in hair extension weft are generally aligned with each other. A fastening component 110 having two extending prongs sharing a single joint, such as a bobby pin or sectioning clip, may be used as securing means by sliding the vertically-extending clip-engaging element 24 with the tape-in hair extension weft 105 aligned on top of it between the two members of the fastening component 110. The pressure applied by the two members of the fastening component 110 "sandwich" the vertically-extending clip-engaging element 24 and hair extension weft together 105, securing it into place.

The clip-engaging elements 3 of the present invention may be arranged in a variety of diverse configurations. The grid formation formed by horizontally-extending clip-engaging elements 20 and vertically-extending clip engaging elements 24, as demonstrated by the preferred embodiment, can be appreciated by one skilled in the art as particularly advantageous for keeping hair extensions organized, as it can serve as a reference point when reapplying hair extensions. For example, a clip-in hair extension weft can be attached to an upper, a first middle, a second middle, or lower horizontal row of clip-engaging elements 20 at the left, center, or right section of the grid which best corresponds to where it is worn on their head (upper, middle, and lower rows referring to areas of the head closest to the crown, ears, and nape of the neck, for example). When reapplying hair extensions, a user can then easily determine where each hair extension weft is meant to be placed for best use by referring to its position along the grid.

In alternative embodiments of the present invention, the main body 1 only includes horizontally-extending clip-engaging elements 20 for the purpose of attaching clip-in hair extensions only, which may be sufficient for many hair extension users. In these embodiments and others, the horizontally-extending clip engaging elements 20 may be attached in rows and segments of different lengths. For example, an embodiment may include a series of horizontal rows which may correspond with a pattern resembling a common placement method for certain types or brands of hair extension sets, making it even easier for a user to reapply hair extensions.

In yet other alternative embodiments of the present invention, the main body 1 may be formed of a rectangular panel 2 wherein only one surface includes an attached plurality of clip-engaging elements 3 and, in the absence of a folding configuration providing a covering element such as that illustrated in FIG. 1, a flexible cover may be attached to the main body 1 which folds over to define an "open" and "closed" position.

Referring now to the main body 1 of the present invention which, in various embodiments, is adapted for folding into a collapsed configuration of a reduced overall dimension. FIGS. 1-4 best illustrate various positions achieved by the preferred embodiment folding according to a "double gate fold" configuration, characterized by three parallel vertical creases extending from the top edge 18 to the bottom edge 19 of the rectangular panel 2, defining a fold line 35 of a first side portion 32, a second fold line 37 of a second side portion 34 and a third fold line 39 of a central portion 36, which facilitate the present invention folding laterally from a first, "open" position (illustrated in FIG. 1) to a second, "halfway closed" position (illustrated in FIG. 4) wherein the first 32 and second side portions with a space of approximately two inch space between their edges.

Figure 4:
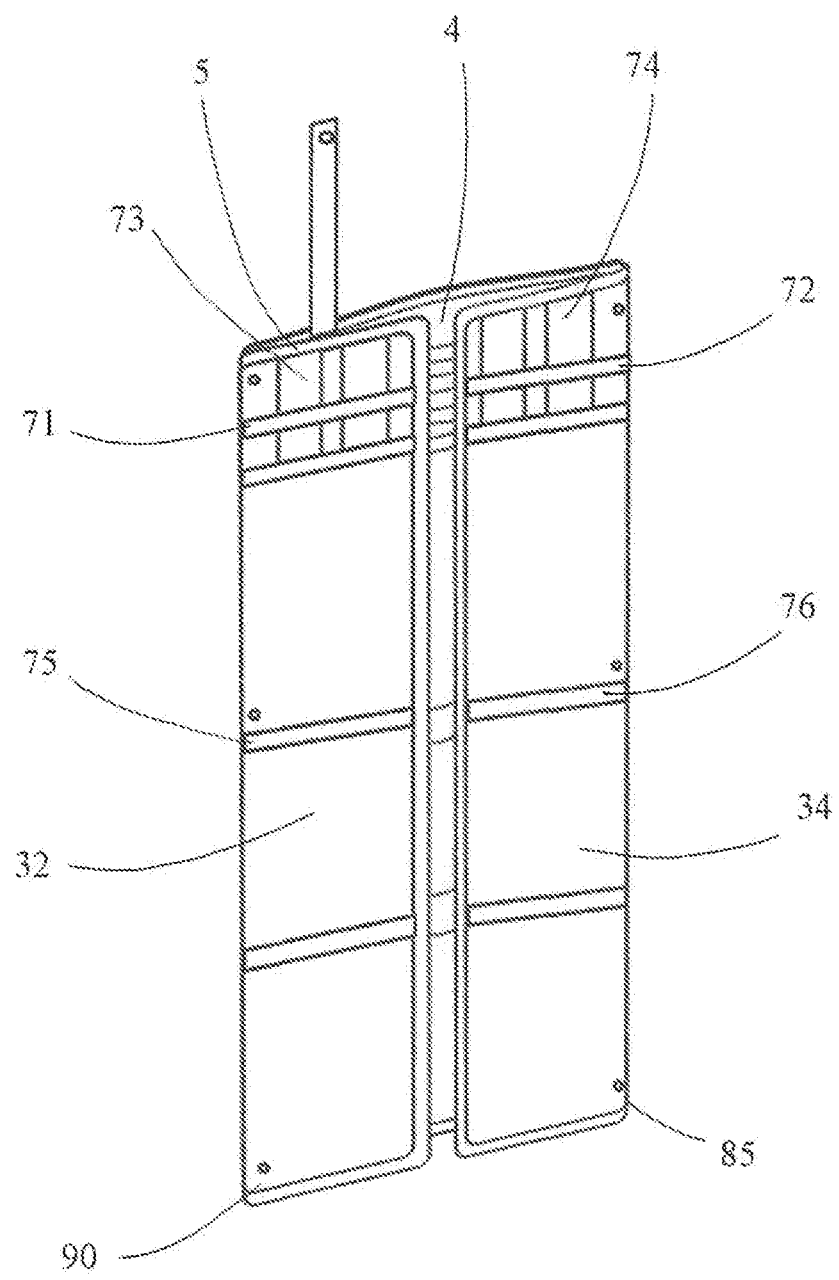
FIG. 4 is a front perspective view of the hair extension storage organizer in a "halfway closed" position, wherein two side portions are folded laterally inward.
Figures 6, 7, 8:
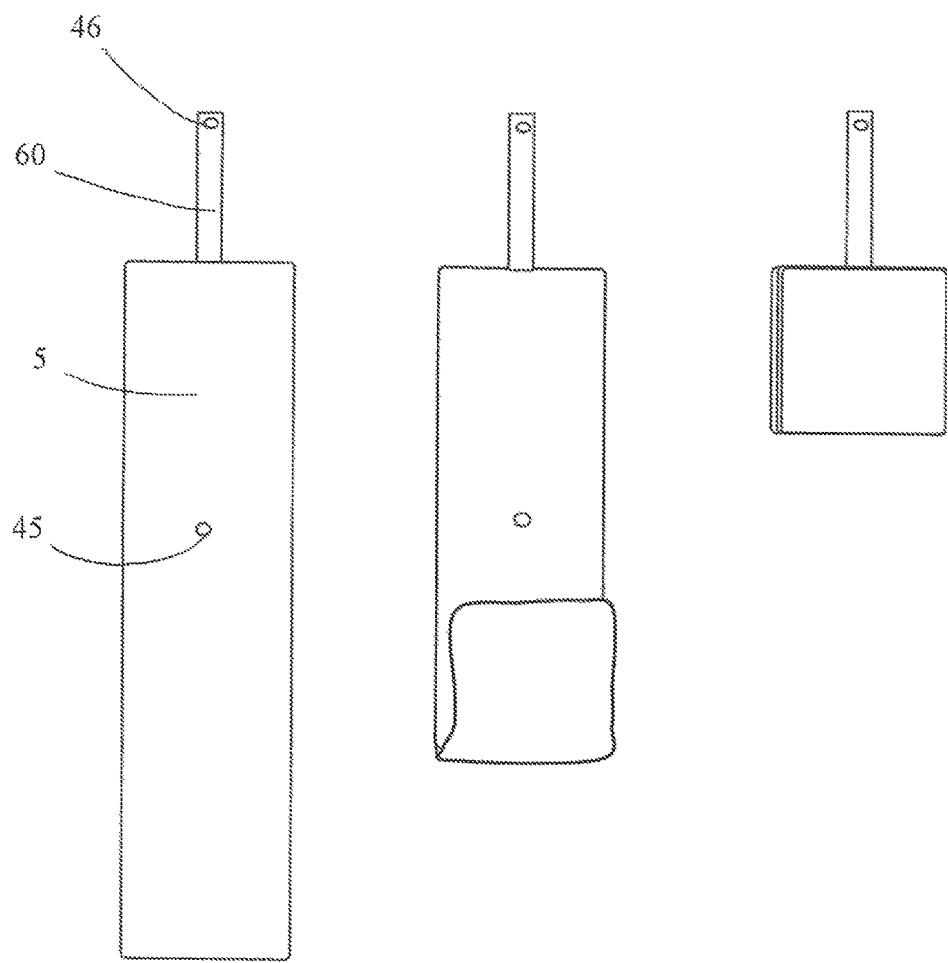
FIG. 6 a top front view of the hair extension storage organizer in a "fully closed" position.
FIG. 7 is a front perspective view of the hair extension storage organizer in a folding position.
FIG. 8. is a front perspective view of the hair extension storage organizer in a "fully folded" position.

From the second position illustrated in FIG. 4, the present invention is adapted to fold into to a third position illustrated in FIG. 6, wherein the central portion 36 folds in half to bring the main body 1 into a "fully closed" position. As illustrated by FIG. 6, the present invention is ¼ its original width as a result of this folding configuration. This folding structure can be practiced with hair extensions attached to the clip-engaging system 3, as they fold laterally with the main body 1 without creasing or bending. Another advantage is demonstrated by the position illustrated in FIG. 4, wherein the first 32 and second portions 34 of the main body 1 fold inwardly over the central portion 36, providing a combined covering element for the clip-engaging system 3 and hair extensions attached thereto.

Figure 2:
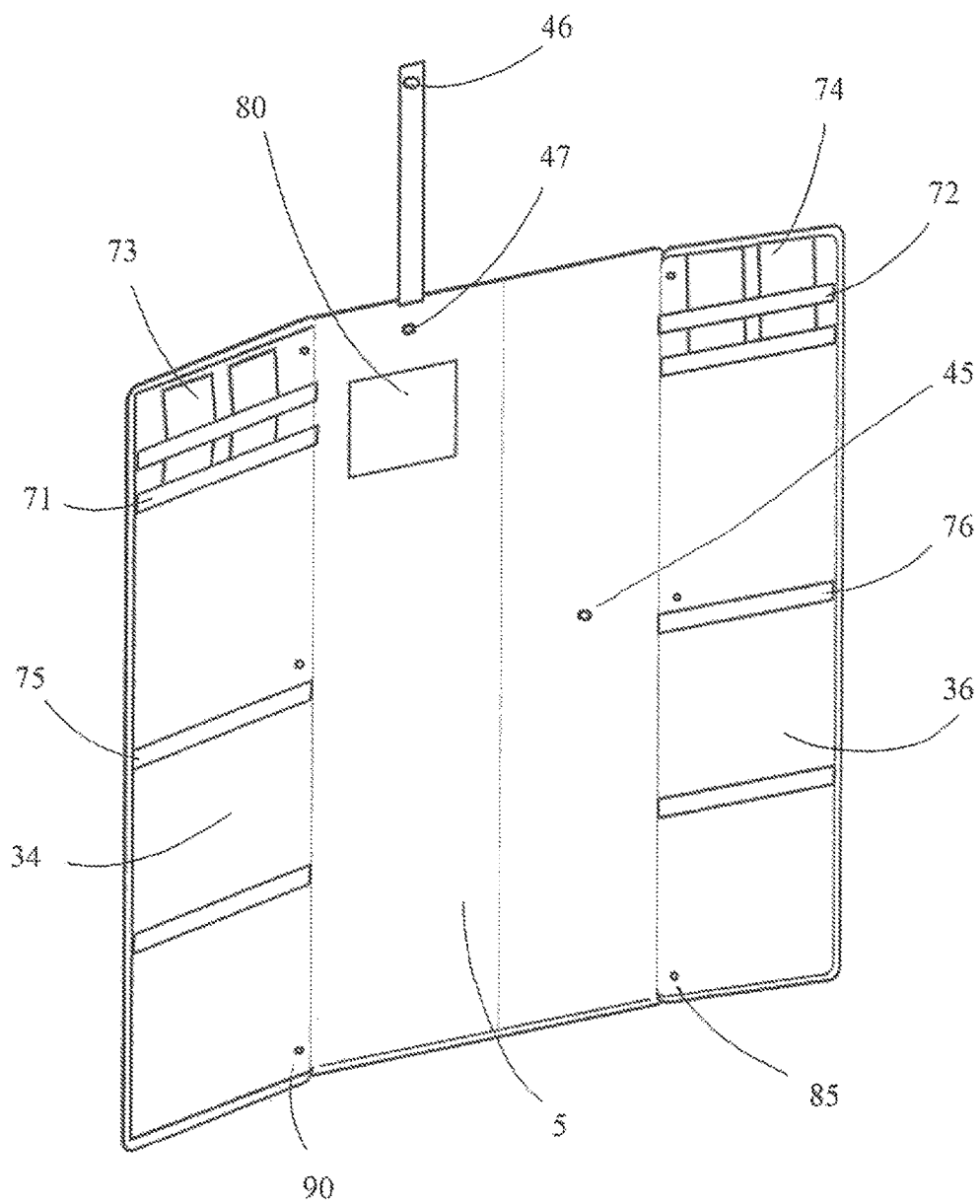
FIG. 2 is a rear perspective view of the hair extension storage organizer in an open position.
Figure 9:
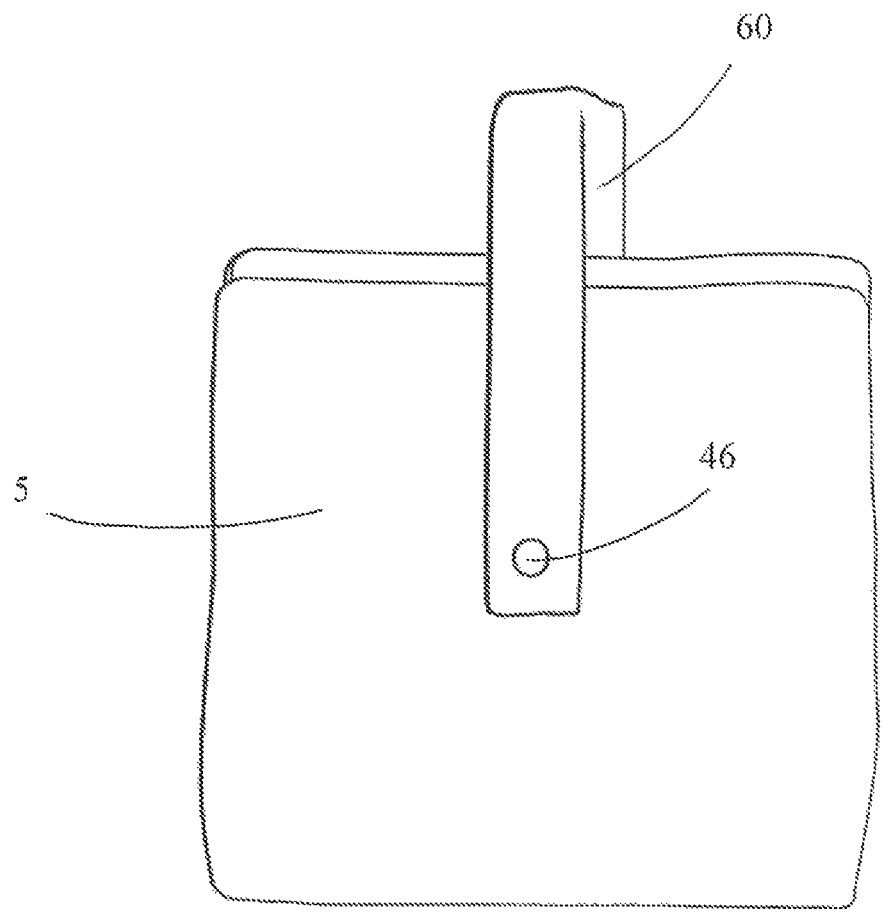
FIG. 9 is s rear perspective view of the hair extension storage organizer in a "fully folded and secured" position.

Referring to FIG. 2, the rectangular panel 2 of the preferred embodiment includes three horizontal creases 41, 42, 43; a central horizontal crease 42 extending along the lateral center line 40 of the main body 1 from the first side edge 16 to the second side edge 17 of the rectangular panel, and two additional horizontal creases 41, 43 each extending from the first side edge 16 to the second side edge 17 at positions substantially equidistant from the central horizontal crease 42. The horizontal creases 41, 42, 43 define fold lines at which the present invention is configured for folding upwardly from the closed position illustrated in FIG. 6, and inwardly over itself (FIG. 7) to achieve a more compact configuration as shown in FIGS. 8 and 9. A receiving closure component 45 is attached at a point on the second surface 5 of the rectangular panel 2 which can be joined with a closure component 46 affixed to a flexible handle member 60 to secure the main body 1 in the collapsed configuration portrayed in a front view in FIG. 8 and in a rear view in FIG. 9.

In alternative embodiments of the present invention, the main body 1 may be adapted for folding according to configurations other than those described above which may include, but are not limited to: a "book" fold wherein the rectangular panel 2 may include only a single vertical crease at which it is adapted for folding in half, a tri-fold configuration characterized by two vertical creases at which a first side portion folds laterally inward and a second side portion subsequently folds laterally inward over the first side portion, or a "gate fold" configuration wherein the rectangular panel 2 includes two vertical creases defining portions of the main body 1 adapted for folding laterally inward over a central portion to meet at the center without overlapping (but the central portion is not adapted for subsequently folding in half)l.

Other features included in various preferred embodiments include retaining members comprising one or more flexible straps 50, 51 are attached to prevent the excessive shifting and movement of the ends of hair that may lead to tangling. The preferred embodiment includes a first flexible strap 50 extending across the first surface 4 of the rectangular panel 2 along a path at or substantially near the lateral central line 40 of the main body 1, with opposing ends attached to the main body 1, preferably at or substantially near the first side edge 16 and second side edge 17 of the rectangular panel 2. A second flexible strap 51 having dimensions substantially congruent to the first flexible strap 50 extends along a path parallel to the first flexible strap 50 between the lateral central line 40 of the main body 1 and the bottom edge 25 of the rectangular panel 2. Space provided between the straps 50, 51 and the first surface 4 allows the ends of hair extensions attached to the clip engaging system 3 to be pulled through and draped gently underneath the flexible straps 50, 51.

FIG. 4 illustrates the preferred embodiment of the present invention in a second position, wherein the second surface 5 of the first portion 32 of the rectangular panel 2 includes a pair of horizontally-extending clip-engaging elements 71, a pair of vertically-extending clip-engaging elements 73, and a pair of flexible straps 75. In this same embodiment, the exterior surface 5 of the second portion 34 of the rectangular panel 2 also includes a pair of horizontally-extending clip-engaging elements 72, a pair of vertically-extending clip-engaging elements 74 and a pair of flexible straps 76. In various other embodiments, the second surface 5 of the first portion 32 and second portion 34 of the rectangular panel 2 may include elements other than those described above, such as a pocket for storage, or may include no additional elements at all.

Another useful aspect of the present invention is a flexible handle member 60, which can be utilized for conveniently hanging or carrying the hair extension holder. Like the clip-engaging system 3, the flexible handle member 60 is formed of non-rigid components and, preferably, is provided by a narrow fabric strap 61 having a closure component connectable to one or more receiving components attached at different points to the main body 1, the result of which may, for example, secure the present invention into a "fully closed and folded" position (illustrated in FIG. 9).

FIG. 1 illustrates the flexible handle member 60 of the preferred embodiment, attached by a first end 64 to the main body 1, with a second end 65 having a closure component 46 connectable to a receiving closure component 80 affixed to the main body 1 at a point distanced from the first end 64 such that when the closure components 45, 46 are joined, the flexible handle member 60 forms a loop. In certain embodiments, the flexible handle member 60 may include end portions which are both detachable from the main body 1. In other embodiments, the flexible handle member may include one disconnected end portion which may enter a loop attached to the main body to reconnect with a second end portion.

A set of three closure components 85, 90 preferably magnetic snaps or regular snaps, are attached to the second surface 5 of the first side portion 32 and second side portion 34 as a means to connect the strap forming flexible handle member 60 to the main body 1 secure the present invention in various positions such as the "fully-closed" position illustrated in FIG. 6 and in its "fully-closed and folded" position illustrated in FIG. 8 and FIG. 9 as well as to connect the strap forming flexible handle member 60 to the main body 1. The main body 1, in various configurations, may include other types of closures, such as magnets, hook-and-eye closures, or other types of components, provided they do not pose a substantial risk of damaging hair extensions.

As can be seen in FIG. 2, the second surface 5 of the rectangular panel, in preferred embodiments, may also include a pocket 80 which provides a convenient storage space for keeping bobby pins, hair clips, hair extension tape, or other small accessories a user may enjoy having handy with the present invention.

What is claimed:

1. A portable hair extension storage organizer implementing a grid structure for securing hair extensions comprising:
a main body at least partially formed of a flexible material, comprising a generally rectangular panel, with a top edge, a bottom edge, a first side edge, a second side edge, a substantially planar interior surface opposing a substantially planar exterior surface,
at least three or more horizontally extending elements attached to the first side edge and second side edge and extending therebetween, and at least three or more vertically extending elements attached to the top portion wherein the horizontally extending elements and the vertically extending elements form a grid configuration capable of holding and retaining a hair extension; and
said rectangular panel further comprising one or more vertical creases extending between the top edge to the bottom edge which define at least one laterally folding portion of the rectangular panel wherein the rectangular panel is configured to fold into a collapsible condition of a reduced dimension along the one or more vertical creases.

2. The portable hair extension storage organizer according to claim 1, further comprising a flexible handle member formed of a non-rigid material having a closure component connectable to one or more receiving components attached to the main body.

3. The portable hair extension storage organizer according to claim 1, wherein the main body has at least one more flexible straps extending horizontally across the interior surface below the grid configuration to prevent excess shifting and movement of the hair extension.

* * * * *